United States Patent [19]
Huffman

[11] Patent Number: 5,832,152
[45] Date of Patent: Nov. 3, 1998

[54] METHOD AND APPARATUS FOR CUT-OVER OF OPTICAL FIBERS

[75] Inventor: John Sinclair Huffman, McDonough, Ga.

[73] Assignee: AT&T Corp., Middletown, N.J.

[21] Appl. No.: 797,373

[22] Filed: Feb. 7, 1997

[51] Int. Cl.[6] .................................................. G02B 6/26
[52] U.S. Cl. .............................. 385/32; 385/31; 385/38; 385/39; 385/44; 385/48; 385/88; 385/136; 385/137
[58] Field of Search ................................. 385/31, 32, 38, 385/39, 42, 44, 45, 46, 48, 88, 89, 123, 136, 137

[56] References Cited

U.S. PATENT DOCUMENTS

| | | | |
|---|---|---|---|
| 4,586,783 | 5/1986 | Campbell et al. | 385/48 X |
| 4,749,248 | 6/1988 | Aberson, et al. | 385/48 X |
| 4,810,052 | 3/1989 | Fling | 385/48 X |
| 4,822,125 | 4/1989 | Beals et al. | 385/48 X |
| 4,856,864 | 8/1989 | Campbell et al. | 385/48 X |
| 5,146,521 | 9/1992 | Hartog | 385/48 X |
| 5,343,541 | 8/1994 | Uken et al. | 385/48 X |

OTHER PUBLICATIONS

Operating Manual, AT&T Model 936A Optical Fiber Identifier (No date of publication).

*Primary Examiner*—Brian Healy
*Attorney, Agent, or Firm*—Robert B. Levy

[57] ABSTRACT

Optical signals that would otherwise transit a first fiber (12), but for a break therein, may be cut-over to a second fiber (16) by clamping the first fiber at first and second spaced locations thereon upstream and downstream, respectively, of the break. Clamping the first fiber creates a microbend at each of the first and second locations at which optical signals exit from, and may be injected into, respectively, the first fiber. The second fiber is likewise clamped at first and second spaced locations thereon to create a pair of microbends at which optical signals may be injected into, and extracted from the second fiber, respectively. Once the first and second fibers are clamped in this fashion, the optical signals extracted from the first fiber at the first location are coupled into the second fiber and then extracted therefrom for injection into the first fiber at the second location thereon.

4 Claims, 2 Drawing Sheets

METHOD AND APPARATUS FOR CUT-OVER OF OPTICAL FIBERS

TECHNICAL FIELD

This invention relates to a technique for transferring ("cutting-over") optical signals on one optical fiber to another.

BACKGROUND ART

Many telecommunications service providers, such as AT&T, employ extensive networks of optical fiber cables for carrying telecommunications traffic. As compared to the copper wires within the metallic cables used in the past, the glass fibers within an optical fiber cable offer a much higher bandwidth and no susceptibility to electrical interference. Unfortunately, like the copper wires used in the past, optical fiber cables are not immune from breakage, often caused by inadvertent excavation near the cable path. In the event of a break in an existing optical fiber cable, a new cable must be installed paralleling the old one. Following installation, each of the fibers in the new cable must be spliced at each of its ends to each of a pair of cut-over points on each broken fiber in the existing cable.

The present cut-over process is labor intensive, requiring a great deal of pre-planning as well as a large number of technicians during the cut-over process itself. During cut-over, technicians at the communications facilities at opposite ends of the broken optical fiber cable work closely with field technicians making the actual cable splice, to switch traffic from each fiber in the broken fiber to a corresponding fiber in the new cable. The process of switching service from each fiber in the broken cable to each new fiber is time consuming. Occasionally, service may be lost as a result of human error, resulting in a loss of traffic and customer dissatisfaction.

Thus, there is need for a technique for facilitating cut-over of traffic from one fiber to another.

BRIEF SUMMARY OF THE INVENTION

Briefly, in accordance with a preferred embodiment of the invention, a technique is provided for cutting over traffic destined for passage on a first fiber to a second fiber. The technique is practiced by clamping the first fiber at first and second spaced locations via first and second clamps. The first and second clamps create a microbend at the first and second locations, respectively, to expose a portion of the first fiber at each location. In practice, the first and second locations lie on opposite sides of any break existing in the first fiber. Each of the opposite ends of a second fiber is coupled via one the first and second clamps, respectively, to one of the first and second locations, respectively. In this way, optical signals escaping from the exposed portion at one of the first and second locations on the first fiber pass via the second fiber to the other of the first and second locations for re-injection into the first fiber. As the optical signals traverse the second fiber, the signals are —O-amplified by an amplifier interposed between the ends of the second fiber.

The above-described technique simplifies the cut-over process because there is no need to switch traffic from the first fiber to the second. The traffic that would otherwise pass on the first fiber between the first and second locations but for a break in that portion of the fiber now passes on the second fiber. However, from the standpoint of network management, the traffic is deemed to pass on the first fiber, thus avoiding any need to switch traffic therefrom.

DETAILED DESCRIPTION

Figure 1:
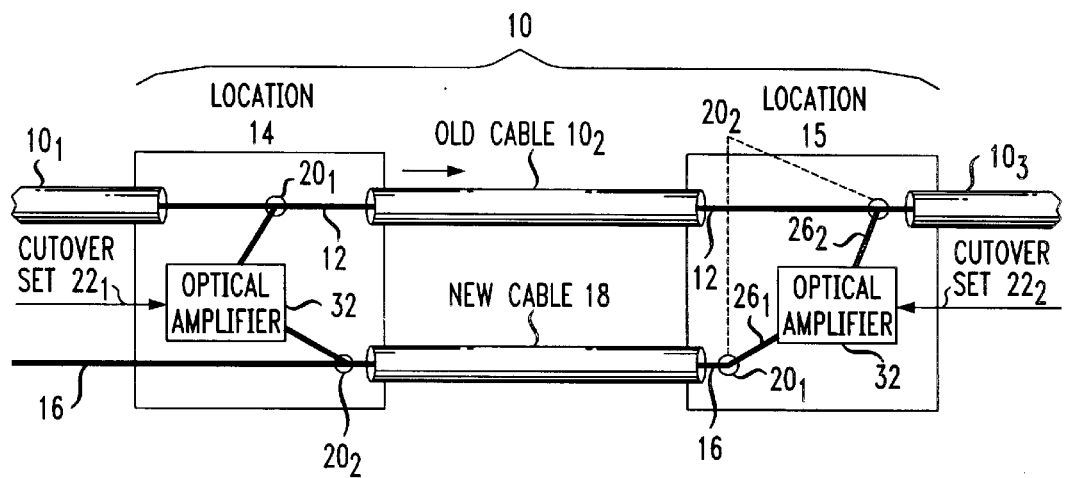
FIG. 1 illustrates the technique of the invention for cutting over traffic from a first optical fiber cable to a second optical fiber, cable

FIG. 1 depicts a first optical fiber cable 10 comprising segments $10_1$, $10_2$ and $10_3$. While unbroken, the cable 10 remains a unitary structure, and the segments $10_1$–$10_3$ are continuous with each other. The cable 10 includes least one optical fiber 12 for carrying optical signals, assumed to pass along the fiber in a left-to-right direction. In the embodiment illustrated in FIG. 1, the cable segment $10_2$ has a break, (as depicted by the "X"), possibly as a result of inadvertent excavation along the cable path. The break may be physical (i.e., a lack of fiber integrity), or functional (i.e., the inability to carry optical signals eventhough the fiber is physically intact). In the past, traffic restoration necessitated interrupting the traffic on the cable 10 and then splicing the ends of a fiber 16 within a second cable 18 between the portions of the fiber 12 associated cable segments $10_1$ and $10_3$, respectively. (Note that the break in the cable segment $10_2$ effectively precludes transmission of traffic on the cable. However, assuming traffic pass from left-to-right, the cable segment $10_1$ still carries optical signals into the segment $10_2$ to the point of the break.) The disadvantage of interrupting traffic on the entire cable (including the cable segment upstream of the break) and thereafter restoring traffic following splicing is that errors can occur in restoring traffic, causing customer dissatisfaction.

In accordance with the invention, cut-over of traffic from the cable 10 to the cable 18 may effectuated without the need to necessarily interrupt the traffic on the cable 10, especially on the cable segment $10_1$ lying upstream of the break. To effect cut-over, the fiber 12 within the cable 10 is exposed at locations 14 and 15. The locations 14 and 15 lie at the demarcation of the cable segments $10_1$ and $10_2$, and $10_2$ and $10_3$, respectively, thereby lying upstream and downstream, respectively of the break. Thereafter, a first clamp $20_1$ of a first cut-over set $22_1$ (described in greater detail with respect to FIG. 2) is applied to the fiber 12 of the cable segment $10_1$ upstream of the break. The second clamp $20_2$ of the cut-over-set $22_1$ is applied one end of the fiber 16 of the new cable 18. The clamps $20_1$ and $20_2$ of a second cut-over set $22_2$ are applied to the fiber 16 at the opposite end of the cable 18 and to the fiber 12 of the cable portion $10_3$ downstream of the break.

Figure 2:
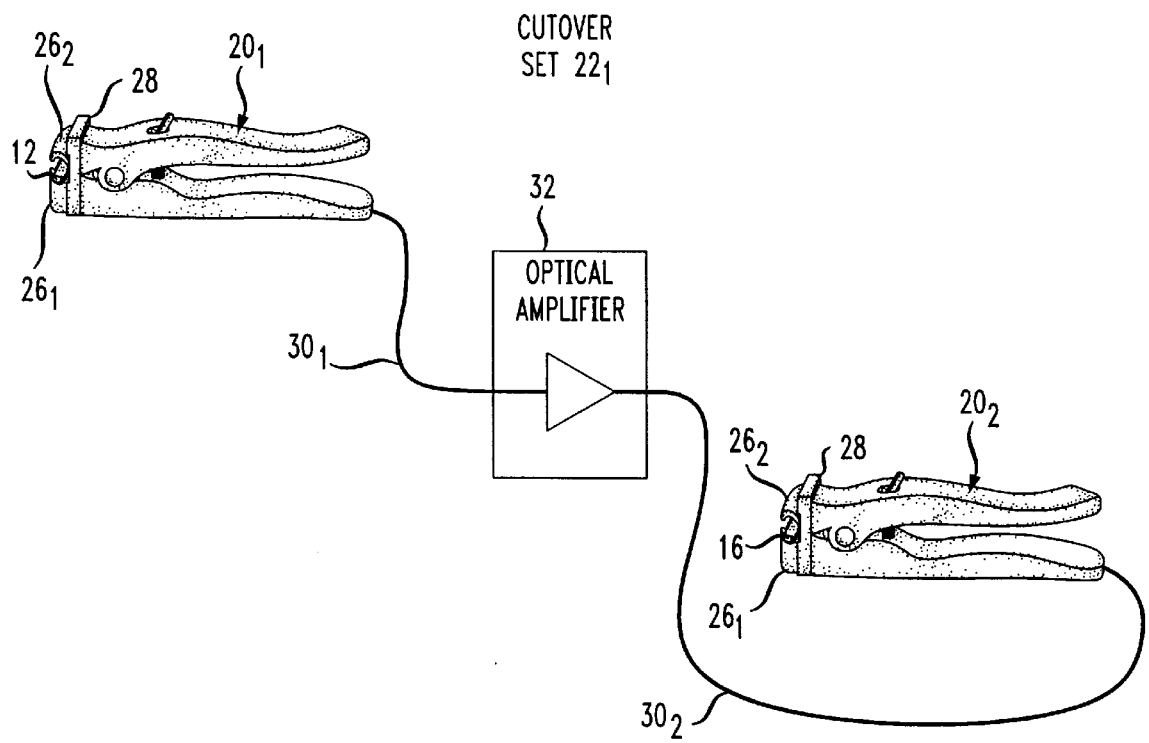
FIG. 2 illustrates a cut-over set, in accordance with the invention, for cutting over traffic from the first cable to the second cable of FIG. 1.

Both the cut-over devices $22_1$ and $22_2$ are identical, and therefore, only the details of the cut-over device $22_2$ will be described. Referring to FIG. 2, the cut-over device $22_1$ includes clamps $20_1$ and $20_2$, each configured in a manner similar to the 94A detector mechanism comprising a portion of the AT&T 936A Optical Fiber Identifier. Each of the clamps $20_1$ and $20_2$ comprises a pliers-like mechanism having a pair of jaws $26_1$ and $26_2$ that grip a portion of an optical fiber between the jaws. As discussed previously, the clamp $20_1$ grips the fiber 12 whereas the clamp $20_2$ grips the fiber 16. Although not explicitly shown in FIG. 2, the jaws $26_1$ and $26_2$ have complementary arcuate surfaces. When urged against the fiber, the arcuate surfaces on the jaws $26_1$ and $26_2$ create a microbend in the fiber. Such a microbend allows a small amount of optical signals carried by the fiber to leak out, or alternatively, allows optical signals to be injected into the fiber.

The jaw $26_2$ of each clamp carries a detector assembly 28 through which optical signals may be injected into, or received from, the fiber clamped between the jaws. A first optical fiber jumper $30_1$ couples the detector assembly 28 on the clamp $20_1$ to an input of an optical amplifier 32. The amplifier 32 has its output coupled via a second optical fiber jumper $30_2$ to the detector assembly 28 of the clamp $20_2$. As may now be appreciated, the clamp $20_1$ serves as the "receiver" clamp for extracting optical signals from a fiber (say fiber 12 of the cable segment $10_1$). By contrast, the clamp $20_2$ serves as the "transmitter" clamp for injecting signals into a fiber, say fiber 16 in cable 18. In this way, the cut-over set $20_1$ couples optical signals from the fiber 12 of the cable segment $10_1$ of FIG. 1 into one end of the fiber 16 of the cable 18. By the same token, when the clamps $20_1$ and $20_2$ of the cut-over set $22_1$ of FIG. 1 are clamped to the opposite end of the fiber 16 and to the fiber 12 of the cable segment $10_3$ downstream of the break, respectively, the cut-over set couples the optical signals on the fiber 16 into the fiber 12 downstream of the break.

As may be appreciated, the cut-over sets $22_1$ and $22_2$ readily permit cut-over of signals that would otherwise transit the cable portion $10_2$ onto the cable 18 without any need to interrupt the signals passing on the cable portion $10_1$ as was previously the case. Thus, the amount of effort needed to effect cut-over is reduced.

Figure 3:
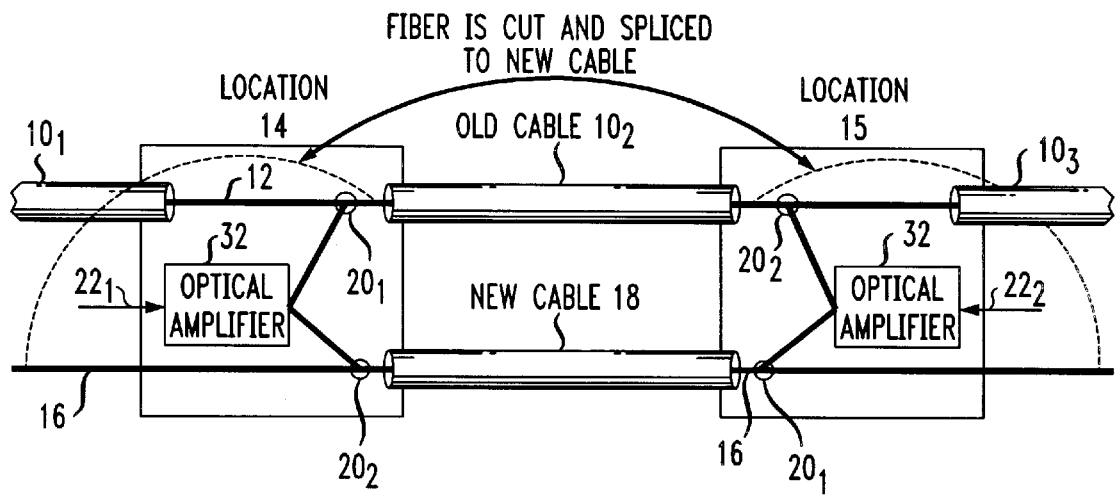
FIG. 3 depicts the step of splicing the ends of the second cable following cut-over.
Figure 4:
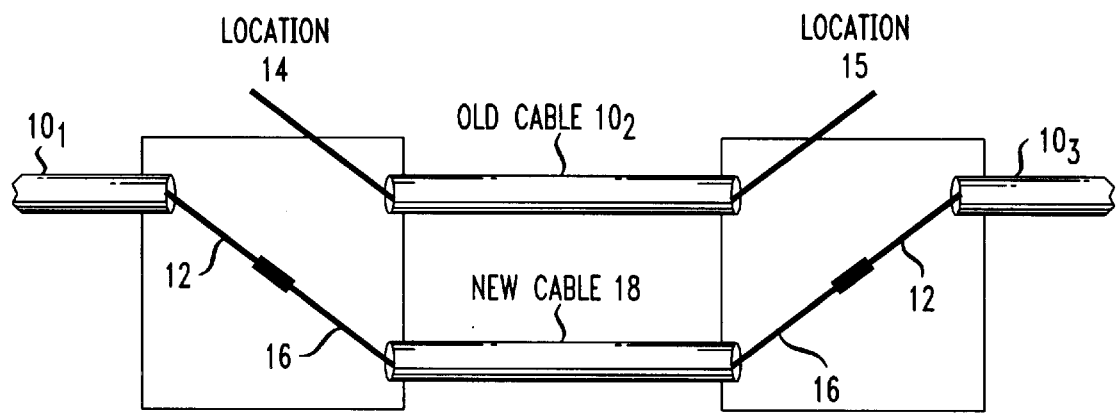
FIG. 4 depicts the status of the first and second optical fiber cables following the splice depicted in FIG. 3.

Referring to FIG. 3, once traffic on the effected segment $10_2$ of the cable 10 is cut-over to the cable 18, then fiber 12 can be cut at the locations 14 and 15 downstream and upstream, respectively of the clamps $20_1$ and $20_2$ of the cut-over sets $22_1$ and $22_2$, respectively. Thereafter, the ends of the fiber 16 of the cable 18 upstream and downstream of the clamps $20_1$ and $20_2$ of the cut-over sets $22_1$ and $22_2$, respectively, are spliced to the ends of the fibers 12—12 of the cable portions $10_1$ and $10_2$, respectively, as indicated seen in FIG. 3. In this way, the cut-over now becomes permanent, as seen in FIG. 4, allowing the cut-over sets $22_1$ and $22_2$ to be removed.

The foregoing describes a technique for cutting over traffic on one optical fiber cable on to another.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method cutting over optical signals that would otherwise transit a first optical fiber but for a break therein, to a second fiber, comprising the steps of:

clamping the first fiber at first and second spaced locations thereon upstream and downstream, respectively, of the break to create a microbend at each of the first and second locations at which optical signals exit from and may be injected into, respectively, the first fiber;

clamping a second fiber at first and second spaced locations thereon to create a microbend at each location at which optical signals may be injected into and exit from the second fiber, respectively;

coupling optical signals exiting the first location of the first fiber for injection into the first location of the second fiber;

amplifying the optical signals injected into the second fiber at the first location; and coupling optical signals exiting the second location of the second fiber for injection into the first fiber at the second location thereon.

2. The method according to claim 1 further comprising the steps of:

splicing opposite ends of the second fiber upstream and downstream of the first and second locations, respectively, where the second fiber is clamped to each of two spaced apart locations on the fiber upstream and downstream of the first and second locations, respectively, where the first fiber is clamped; and unclamping the first and second fibers once the fibers are spliced together.

3. A cut-over set for picking off optical signals on a first fiber for injection onto a second fiber, comprising:

first clamping means for clamping the first fiber to create a microbend therein at which optical signals exit the first fiber, the first clamping means including detector means for receiving the optical signals;

second clamping means for clamping the second fiber to create a microbend therein at which optical signals may be injected into the second fiber, the second clamping means including transmitter means for injecting optical signals into the second fiber at the microbend therein; and means for coupling the light received by the detector means of the first clamping means into the transmitter means of the second clamping means.

4. The apparatus according to claim 3 wherein the coupling means comprises;

an optical amplifier having an input and an output;

a first optical fiber coupled between the detector means of the first clamping means and the input of the optical amplifier for carrying the optical signals detected by said detector means to the optical amplifier; and a second optical fiber jumper coupled between the output of the optical amplifier and the transmitter means of the second clamping means for carrying optical signals from the optical amplifier to the transmitter means.

* * * * *